US012664835B2

(12) United States Patent
Merz

(10) Patent No.: US 12,664,835 B2
(45) Date of Patent: Jun. 23, 2026

(54) BACKUP FOR TIRE-PRESSURE MONITORING SYSTEM

(71) Applicant: Ford Global Technologies, LLC, Dearborn, MI (US)

(72) Inventor: Adam Merz, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 40 days.

(21) Appl. No.: 18/899,951

(22) Filed: Sep. 27, 2024

(65) Prior Publication Data

US 2026/0094479 A1     Apr. 2, 2026

(51) Int. Cl.
| | |
|---|---|
| *G07C 5/08* | (2006.01) |
| *B60C 23/06* | (2006.01) |
| *G07C 5/02* | (2006.01) |
| *B60C 23/04* | (2006.01) |

(52) U.S. Cl.
CPC ............ *G07C 5/0816* (2013.01); *B60C 23/06* (2013.01); *G07C 5/02* (2013.01); *B60C 23/0471* (2013.01)

(58) Field of Classification Search
CPC .... G07C 5/0816; G07C 5/02; B60C 23/0471; B60C 23/06
See application file for complete search history.

(56) References Cited

U.S. PATENT DOCUMENTS

| | | | | | |
|---|---|---|---|---|---|
| 6,594,566 | B1 * | 7/2003 | Skoff | ................... | B60C 23/002 |
| | | | | | 701/33.9 |
| 6,691,059 | B1 * | 2/2004 | Griesser | ............... | B60C 23/061 |
| | | | | | 340/447 |

| | | | | | |
|---|---|---|---|---|---|
| 6,691,060 | B2 * | 2/2004 | Kachel | ................... | B60T 8/885 |
| | | | | | 702/14 |
| 8,554,402 | B2 * | 10/2013 | Wada | ................... | B60C 23/061 |
| | | | | | 701/29.2 |
| 8,577,540 | B2 * | 11/2013 | Wada | ................... | B60C 23/061 |
| | | | | | 701/32.9 |
| 9,387,736 | B2 * | 7/2016 | Yanase | ................. | B60C 23/061 |
| 12,447,778 | B2 * | 10/2025 | Koppisetty | ......... | B60C 23/0488 |
| 2003/0227380 | A1 * | 12/2003 | Piech | ................... | B60C 23/061 |
| | | | | | 340/443 |
| 2007/0061100 | A1 * | 3/2007 | Hall | ...................... | B60C 23/061 |
| | | | | | 702/140 |

(Continued)

FOREIGN PATENT DOCUMENTS

| | | | | |
|---|---|---|---|---|
| CN | 105818618 | A | 8/2016 | |
| DE | 102021201519 | A1 * | 8/2022 | ........... B62D 63/064 |

(Continued)

OTHER PUBLICATIONS

DE102021201519A1_translation (Year: 2025).*
PH09240446A_-_translation.pdf (Year: 2025).*

*Primary Examiner* — Fadey S. Jabr
*Assistant Examiner* — Ashutosh Pande
(74) *Attorney, Agent, or Firm* — Lorne Forsythe; Brooks Kushman P.C.

(57)                    ABSTRACT

A computer includes a processor and a memory, and the memory stores instructions executable by the processor to, in response to a speed at which a vehicle is traveling exceeding a vehicle-speed threshold, determine a difference between wheel speeds of different wheels of the vehicle; and, in response to the difference exceeding a difference threshold, output a message indicating low pressure of a tire of one of the wheels.

20 Claims, 2 Drawing Sheets

(56)                     References Cited

U.S. PATENT DOCUMENTS

| | | | |
|---|---|---|---|
| 2011/0029214 A1* | 2/2011 | Fu | B60C 23/003 |
| | | | 702/148 |
| 2011/0190975 A1* | 8/2011 | Hourlier | B60C 23/061 |
| | | | 701/31.4 |
| 2017/0087943 A1* | 3/2017 | Bill | B64F 5/60 |
| 2017/0174193 A1* | 6/2017 | Kirkpatrick | B60T 8/1725 |
| 2019/0202248 A1* | 7/2019 | Kandler | B60C 23/0481 |

FOREIGN PATENT DOCUMENTS

| | | | | |
|---|---|---|---|---|
| JP | H09240446 A * | 9/1997 | | B60T 8/1725 |
| KR | 20180078077 A | 7/2018 | | |
| WO | WO-2019229634 A1 * | 12/2019 | | B60C 23/04 |
| WO | WO-2023025599 A1 * | 3/2023 | | B60C 23/0479 |

* cited by examiner

BACKUP FOR TIRE-PRESSURE MONITORING SYSTEM

BACKGROUND

A tire-pressure monitoring system (TPMS) is a system for monitoring the air pressure of tires of a vehicle. When the TPMS detects that one of the tires of the vehicle is inflated below a threshold, an indicator light on the instrument panel illuminates to inform a driver about the tire. TPMS uses pressure sensors mounted either inside or on an outer surface of each tire. Pressure sensors mounted inside the tires communicate using wireless short-range signals.

DETAILED DESCRIPTION

Figure 1:
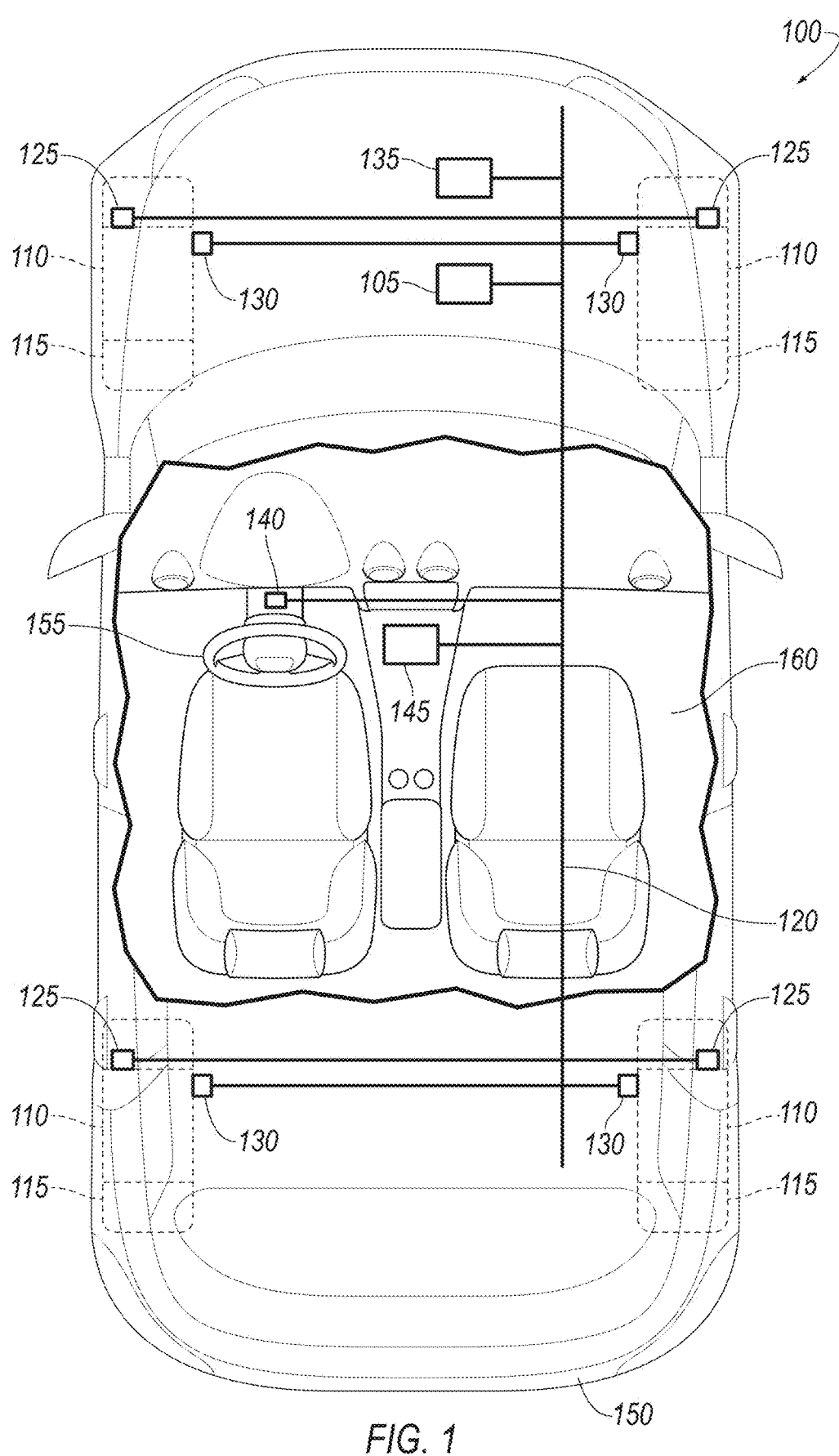
FIG. 1 is a diagrammatic top view of an example vehicle.

This disclosure provides techniques for functional redundancy for a tire-pressure monitoring system (TPMS) of a vehicle. In other words, the task of monitoring tire pressures can still be performed even if the TPMS is inactive. If the TPMS is inactive, a computer of the vehicle is programmed to, in response to a speed at which the vehicle is traveling exceeding a vehicle-speed threshold, determine a difference between wheel speeds of different wheels of the vehicle; and, in response to the difference exceeding a difference threshold, output a message indicating low pressure of a tire of one of the wheels. If one tire is rotating faster than the other tires, then the tire has a smaller diameter and thus is likely underinflated. The wheel speeds may be reported by wheel speed sensors on each of the wheels. Measurements by the wheel speed sensors can experience greater fluctuations at lower speeds. The use of the vehicle-speed threshold can help the difference between the wheel speeds be sufficiently accurate to use for monitoring the tire pressures.

A computer includes a processor and a memory, and the memory stores instructions executable by the processor to, in response to a speed at which a vehicle is traveling exceeding a vehicle-speed threshold, determine a difference between wheel speeds of different wheels of the vehicle; and, in response to the difference exceeding a difference threshold, output a message indicating low pressure of a tire of one of the wheels.

In an example, the instructions may further include instructions to, in response to the speed exceeding the vehicle-speed threshold and a steering angle of the vehicle being within a steering-angle range, determine the difference between the wheel speeds. In a further example, the steering-angle range may include a straight-ahead steering angle.

In an example, the instructions may further include instructions to, in response to the speed exceeding the vehicle-speed threshold and a tire-pressure monitoring system of the vehicle being inactive, determine the difference between the wheel speeds.

In an example, the vehicle may include a respective tire-pressure monitoring system for each tire, and the instructions may further include instructions to, in response to the speed exceeding the vehicle-speed threshold and at least one of the tire-pressure monitoring systems being inactive, determine the difference between the wheel speeds.

In an example, the instructions may further include instructions to, in response to the speed exceeding the vehicle-speed threshold for at least a time threshold, determine the difference between the wheel speeds.

In an example, the instructions may further include instructions to, in response to the speed exceeding the vehicle-speed threshold and a current operational mode of the vehicle being a first operational mode, determine the difference between the wheel speeds.

In an example, the difference may be between a fastest wheel speed and a slowest wheel speed. In a further example, the fastest wheel speed and the slowest wheel speed may occur simultaneously.

In another further example, the difference may be expressed as a proportion of the slowest wheel speed.

In an example, the instructions may further include instructions to, in response to the difference exceeding the difference threshold, set a flag in the memory. In a further example, the instructions may further include instructions to, in response to the vehicle starting with the flag set, output the message indicating low pressure of the tire.

In a further example, the instructions may further include instructions to, in response to the difference being less than the difference threshold for at least a time threshold after setting the flag, remove the flag.

A method includes, in response to a speed at which a vehicle is traveling exceeding a vehicle-speed threshold, determining a difference between wheel speeds of different wheels of the vehicle; and, in response to the difference exceeding a difference threshold, outputting a message indicating low pressure of a tire of one of the wheels.

In an example, the method may further include, in response to the speed exceeding the vehicle-speed threshold and a steering angle of the vehicle being within a steering-angle range, determining the difference between the wheel speeds.

In an example, the method may further include, in response to the speed exceeding the vehicle-speed threshold and a tire-pressure monitoring system of the vehicle being inactive, determining the difference between the wheel speeds.

In an example, the vehicle may include a respective tire-pressure monitoring system for each wheel, and the method may further include, in response to the speed exceeding the vehicle-speed threshold and at least one of the tire-pressure monitoring systems being inactive, determining the difference between the wheel speeds.

In an example, the method may further include, in response to the speed exceeding the vehicle-speed threshold for at least a time threshold, determining the difference between the wheel speeds.

In an example, the method may further include, in response to the speed exceeding the vehicle-speed threshold and a current operational mode of the vehicle being a first operational mode, determining the difference between the wheel speeds.

In an example, the difference may be between a fastest wheel speed and a slowest wheel speed.

With reference to the Figures, wherein like numerals indicate like parts throughout the several views, a computer 105 includes a processor and a memory, and the memory stores instructions executable by the processor to, in response to a speed at which a vehicle 100 is traveling exceeding a vehicle-speed threshold, determine a difference between wheel speeds of different wheels 110 of the vehicle 100; and, in response to the difference exceeding a difference threshold, output a message indicating low pressure of a tire 115 of one of the wheels 110.

With reference to FIG. 1, the vehicle 100 may be any passenger or commercial automobile such as a car, a truck, a sport utility vehicle, a crossover, a van, a minivan, a taxi, a bus, etc. The vehicle 100 may include the wheels 110, the tires 115, the computer 105, a communications network 120, tire-pressure monitoring systems (TPMSs) 125, wheel speed sensors 130, a speedometer 135, a steering-angle sensor 140, and a user interface 145.

The computer 105 is a microprocessor-based computing device such as a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design to describe digital and mixed-signal systems such as FPGA and ASIC. For example, an ASIC is manufactured based on VHDL programming provided pre-manufacturing, whereas logical components inside an FPGA may be configured based on VHDL programming (e.g., stored in a memory electrically connected to the FPGA circuit). The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through the communications network 120. The communications network 120 may be a controller area network (CAN) bus, Ethernet, WiFi, Local Interconnect Network (LIN), onboard diagnostics connector (OBD-II), and/or any other wired or wireless communications network. The computer 105 may be communicatively coupled to the TPMSs 125, the wheel speed sensors 130, the speedometer 135, the steering-angle sensor 140, the user interface 145, and other components via the communications network 120.

The vehicle 100 includes a plurality of wheels 110, typically four wheels 110. Each wheel 110 is rotatable relative to a body 150 of the vehicle 100. The wheel 110 is radially symmetric and includes two radially symmetric flanges (not shown) for mounting a tire 115. The wheel 110 may be formed of a nonflexible material (e.g., a metal such as steel or aluminum).

The vehicle 100 includes a tire 115 mounted on each wheel 110. Each tire 115 is an inflatable ring mounted to the respective wheel 110. The tire 115 provides shock absorption and traction. The tire 115 and the wheel 110 define a toroidally shaped inflation chamber that may be filled with pressurized inflation medium, such as air. The inflation chamber has a toroidal shape. The tire 115 may be formed of synthetic or natural rubber, or other elastomeric materials that provide sufficient elasticity, durability, and grip. The tire 115 may also include cords (not shown) running through the elastomeric material and/or chemical compounds added to the elastomeric material.

The vehicle 100 includes a respective TPMS 125 for each tire 115. The TPMS 125 may be a direct TPMS sensor (i.e., a pressure sensor). Each TPMS 125 may be positioned to monitor the pressure of the respective inflation chamber defined by the respective tire 115. The TPMS 125 may communicate using wireless short-range signals with the communications network 120 and the computer 105.

The vehicle 100 includes a respective wheel speed sensor 130 for each wheel 110. Each wheel speed sensor 130 may use a magnetic field detector to count interruptions of a magnetic field by a ferromagnetic toothed reluctor ring (also called a tone wheel) disposed on the wheel 110. The wheel speed sensor 130 may be a passive sensor, which includes a ferromagnetic rod with a permanent magnet at one end and wrapped in wire. The rotation of the reluctor ring induces a current in the wire, which serves as the output of the wheel speed sensor 130. Alternatively, the wheel speed sensor 130 may be an active sensor, which further includes signal conditioning circuitry to encode the output. The output of each wheel speed sensor 130 is a periodic wave (e.g., sinusoidal or square wave) from which a number of revolutions of the wheel 110 can be counted.

The speedometer 135 may be any sensor suitable for measuring the speed at which the vehicle 100 is traveling, for example, as is known, a mechanical or eddy-current speedometer, or a vehicle speed sensor. A vehicle speed sensor may use a magnetic field detector to count interruptions of a magnetic field by a toothed metal disk disposed on a driveshaft of the vehicle 100. Alternatively, the wheel speed sensors 130 may collectively serve as the speedometer 135. For example, the speed of the vehicle 100 may be derived from a mean of the wheel speeds.

The steering-angle sensor 140 detects a steering angle of the vehicle 100. The steering angle is the angle formed by the direction that the front wheels 110 are turned and a longitudinal axis of the vehicle 100. The steering-angle sensor 140 may be a position sensor positioned to detect the orientation of a steering wheel 155 of the vehicle 100. For example, the steering-angle sensor 140 may be mounted to a steering column (not shown). The steering-angle sensor 140 may be, for example, a Hall effect sensor, a rotary encoder, etc. The steering-wheel angle reported by the steering-angle sensor 140 may be converted to the steering angle according to a known steering ratio of the vehicle 100.

The user interface 145 presents information to and receives information from an operator of the vehicle 100. The user interface 145 may be located on an instrument panel in a passenger compartment 160 of the vehicle 100, and/or wherever may be readily seen by the operator. The user interface 145 may include dials, digital readouts, screens, speakers, and so on for providing information to the operator, such as human-machine interface (HMI) elements such as are known. The user interface 145 may include buttons, knobs, keypads, microphone, and so on for receiving information from the operator.

As a general overview, the computer 105 is programmed to, in response to a plurality of conditions being satisfied, determine whether any of the tires 115 have low pressure based on the wheel speeds. The conditions may include at least one TPMS 125 being inactive, the speed at which the vehicle 100 is traveling exceeding the vehicle-speed threshold, a steering angle of the vehicle 100 being within a steering-angle range, and/or one or more current operational modes of the vehicle 100 being prespecified operational modes, as will be described in turn below. In response to all the conditions being satisfied, the computer 105 uses the wheel speeds to determine whether any of the tires 115 have low pressure, as will be described below. In response to at least one of the conditions not being satisfied, the computer 105 may refrain from using the wheel speeds to determine whether any of the tires 115 have low pressure. In that case, the computer 105 may use data from the TPMSs 125 (if active) to determine whether any of the tires 115 have low pressure, or the computer 105 may refrain from determining whether any of the tires 115 have low pressure.

The computer 105 may determine whether any of the tires 115 have low pressure based on the wheel speeds in response to the TPMS 125 being inactive (e.g., in response to at least one of the TPMSs 125 being inactive). For example, the computer 105 may determine that one of the TPMSs 125 is inactive by receiving a message (e.g., a diagnostic trouble code (DTC)) indicating that the TPMS 125 is inactive. For another example, the computer 105 may determine that a TPMS 125 is inactive in response to not receiving data from the TPMS 125 for at least a time threshold (which will be referred to as a first time threshold because other time thresholds are discussed below). The first time threshold may be chosen to be longer than a rate at which the TPMS 125 sends data. If active, the TPMS 125 may provide a more accurate determination of whether a tire 115 has low pressure.

The computer 105 may determine whether any of the tires 115 have low pressure based on the wheel speeds in response to the speed at which the vehicle 100 is traveling exceeding the vehicle-speed threshold. The computer 105 may receive the speed from the speedometer 135. The vehicle-speed threshold may be chosen to be sufficiently high to provide accurate results from the wheel speed sensors 130 and sufficiently low as to be exceeded during typical driving of the vehicle 100 (e.g., 15 miles per hour). For example, the computer 105 may determine whether any of the tires 115 have low pressure in response to the speed exceeding the vehicle-speed threshold for at least a second time threshold. The second time threshold may be chosen to be sufficiently long for fluctuations in the wheel speeds reported by the wheel speed sensors 130 to average out, thereby increasing accuracy.

The computer 105 may determine whether any of the tires 115 have low pressure based on the wheel speeds in response to the steering angle of the vehicle 100 being within the steering-angle range. The computer 105 may receive the steering angle from the steering-angle sensor 140. The steering-angle range may be chosen to encompass typical variation in the steering angle when the vehicle 100 is driving straight. The steering-angle range thus includes a straight-ahead steering angle (i.e., the steering angle that occurs when the front wheels 110 are oriented parallel to the longitudinal axis of the vehicle 100). For example, the steering-angle range may be from −15° to +15°, with 0° being the straight-ahead steering angle. The use of the steering-angle range can ensure that the wheels 110 on one side of the vehicle 100 are not covering more ground (and therefore spinning faster) than the wheels 110 on the other side.

The computer 105 may determine whether any of the tires 115 have low pressure based on the wheel speeds in response to the current operational mode of the vehicle 100 being a first operational mode. For the purposes of this disclosure, "operational mode" is defined as a datum or set of data indicating how one or more components of the vehicle 100 operate. The vehicle 100 may have a plurality of current operational modes at any given time. Each of the current operational modes may be selected or determined from set of stored operational modes (e.g., a current operational mode for a component may be chosen from a first operational mode, a second operational mode, and a third operational mode). For example, one operational mode may indicate whether a traction-control system is engaged, so the current operational mode may be either "traction-control system engaged" or "traction-control system not engaged." The computer 105 may determine whether the any of the tires 115 have low pressure based on the wheel speeds in response to the current operational mode being "traction-control system not engaged" but not in response to the current operational mode being "traction control system engaged." For another example, an operational mode may indicate whether the ignition is on, so the current operational mode may be "on," "off," or "accessory-power." The computer 105 may determine whether the any of the tires 115 have low pressure based on the wheel speeds in response to the current operational mode being "on" but not in response to the current operational mode being "off" or "accessory-power." For another example, a current operational mode may be either factory mode (used when the vehicle 100 is being assembled), transport mode (used when the vehicle 100 is being shipped to a destination), or operator mode (used for typical driving by the operator). The computer 105 may determine whether the any of the tires 115 have low pressure based on the wheel speeds in response to the current operational mode being operator mode but not in response to the current operational mode being factory mode or transport mode. For another example, the operational mode may indicate whether the parking brake is on or off. The computer 105 may determine whether the any of the tires 115 have low pressure based on the wheel speeds in response to the current operational mode being parking brake off but not in response to the current operational mode being parking brake on. The use of the current operational mode can ensure that the vehicle 100 is not in a current operational mode in which false positives for the low pressure may occur.

In response to all the conditions being satisfied, the computer 105 determines whether any of the tires 115 have low pressure based on the wheel speeds. As a general overview, the computer 105 determines whether a difference between the wheel speeds of different wheels 110 exceeds a difference threshold. If so, one of the tires 115 is deemed to have low pressure, and the computer 105 may set a flag in memory indicating the low pressure of the tire 115 and output a message indicating the low pressure of the tire 115.

The computer 105 determines the difference between wheel speeds of different wheels 110 of the vehicle 100. The difference may be between a fastest wheel speed and a slowest wheel speed. The fastest wheel speed and the slowest wheel speed may occur simultaneously. In other words, the fastest wheel speed $\omega_{fast}(t)$ at a time t may be a maximum of the four wheel speeds of the respective wheels 110 reported at time t (i.e., $\omega_{fast}(t)=\max(\omega_1(t), \omega_2(t), \omega_3(t), \omega_4(t))$). The slowest wheel speed $\omega_{slow}(t)$ at a time t may be a minimum of the four wheel speeds of the respective wheels 110 reported at time t (i.e., $\omega_{slow}(t)=\min(\omega_1(t), \omega_2(t), \omega_3(t), \omega_4(t))$). The use of the fastest and slowest wheel speeds can ensure the widest spread and thereby detect most situations of low tire pressure (e.g., including one, two, or three tires 115 having low pressure). The difference $\Delta\omega(t)$ may be expressed as a proportion of the slowest wheel speed, such as in the following expression:

$$\Delta\omega(t) = \frac{\omega_{fast}(t) - \omega_{slow}(t)}{\omega_{slow}(t)}$$

Scaling the difference by the slowest wheel speed allows the differences in wheel speeds to be comparable at different speeds of the vehicle 100.

The computer 105 determines whether the difference $\Delta\omega(t)$ exceeds the difference threshold $\omega_{th}$ (i.e., $\Delta\omega(t)>\omega_{th}$). The difference threshold may be a preset value stored in the memory of the computer 105. The difference threshold may be chosen to indicate that the pressure of the tire 115 with the slowest wheel speed is below a recommended tire pressure for the tire 115. The computer 105 may, in response to the difference exceeding the difference threshold, set the flag in memory and/or output the message indicating the low pressure of the tire 115.

The computer 105 may set the flag in memory indicating the low pressure of the tire 115 in response to the difference exceeding the difference threshold. For example, the flag may be a first value of a binary variable. The first value of the binary variable (e.g., 1) indicates that at least one of the tires 115 has low pressure, and a second value of the binary variable (e.g., 0) indicates that none of the tires 115 have low pressure. For another example, the flag may be a diagnostic trouble code (DTC), which may be formatted according to a standard such as On-Board Diagnostics II (OBD-II). According to OBD-II, the format of a DTC is a letter followed by four digits, the combination of which can identify a particular issue with the vehicle 100 (e.g., a fault associated with a vehicle component).

The computer 105 may output the message indicating the low pressure of the tire 115 in response to the difference exceeding the difference threshold. For example, the computer 105 may output the message in response to the flag being set (which occurs in response to the difference exceeding the difference threshold). The computer 105 may output the message by actuating the user interface 145. The computer 105 may actuate the user interface 145 to illuminate a light on a dashboard the vehicle 100. The light may be a light specifically for low tire pressure. Alternatively or additionally, the computer 105 may actuate the user interface 145 to emit a sound such as a chime through a speaker of the user interface 145. Alternatively or additionally, the computer 105 may actuate the user interface 145 to display a message on a screen of the user interface 145. The message may state that one of the tires 115 has low pressure.

The flag may persist in the memory through an ignition cycle of the vehicle 100. For example, the binary variable may retain its value or the DTC may remain set when the vehicle 100 is turned off and then started up. The computer 105 may be programmed to, in response to the vehicle 100 starting with the flag set, output the message indicating the low pressure of the tire 115. The operator may thus be reminded of the low pressure until the flag is removed.

The computer 105 may be programmed to, in response to the difference being less than the difference threshold for at least a third time threshold after setting the flag, remove the flag. The third time threshold may be chosen to be longer than a random fluctuation in tire pressure. The third time threshold may be the same or different than the second time threshold. The computer 105 may determine that the difference is less than the difference threshold for at least the third time threshold after setting the flag (i.e., $\Delta\omega(t)<\omega_{th}$ is true for t from $t_{flag}$ to $t_{flag}+T$, in which $t_{flag}$ is the time at which the flag is set and T is the third time threshold). The computer 105 may remove the flag by, for example, setting the binary variable to the second value or removing the DTC. The computer 105 may also remove the flag in response to the TPMSs 125 being active and indicating that the tires 115 do not have low pressure.

Figure 2:
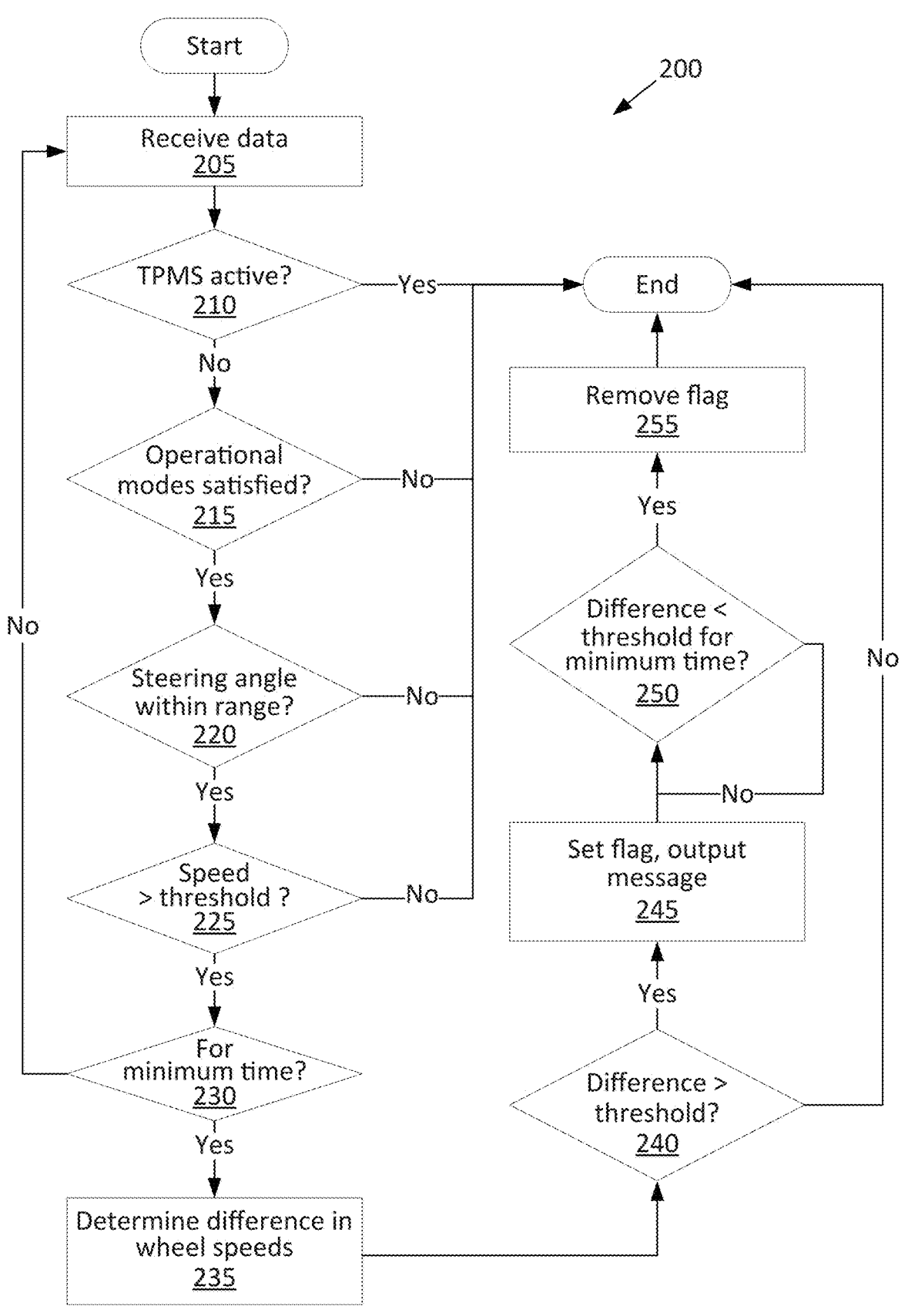
FIG. 2 is a flowchart of an example process for determining a tire pressure of the vehicle.

FIG. 2 is a flowchart illustrating an example process 200 for monitoring for low pressure of the tires 115. The memory of the computer 105 stores executable instructions for performing the steps of the process 200 and/or programming can be implemented in structures such as mentioned above. As a general overview of the process 200, the computer 105 receives data. If the conditions are satisfied (i.e., at least one of the TPMSs 125 is inactive, the current operational modes are in the respective first operational modes, the steering angle is within the steering-angle range, and the speed of the vehicle 100 exceeds the vehicle-speed threshold for at least the second time threshold), the computer 105 determines the difference between the wheel speeds. In response to the difference exceeding the difference threshold, the computer 105 sets the flag and outputs the message indicating the low pressure of the tire 115. Once the flag is set, the computer 105 removes the flag in response to the difference being less than the difference threshold for at least the third time threshold after setting the flag.

The process 200 begins in a block 205, in which the computer 105 receives data from the TPMSs 125 (if active), the wheel speed sensors 130, the speedometer 135, the steering-angle sensor 140, and other components indicating the current operational modes.

Next, in a decision block 210, the computer 105 determines whether the TPMSs 125 are active, as described above. In response to the TPMSs 125 being active, the process 200 ends. In response to at least one TPMS 125 being inactive, the process 200 proceeds to a decision block 215.

In the decision block 215, the computer 105 determines whether the current operational modes of the vehicle 100 are in the respective first operational modes, as described above. In response to at least one current operational mode not being in the respective first operational mode, the process 200 ends. In response to the current operational modes being in the respective first operational modes, the process 200 proceeds to a decision block 220.

In the decision block 220, the computer 105 determines whether the steering angel is within the steering-angle range, as described above. In response to the steering angle being outside the steering-angle range, the process 200 ends. In response to the steering angle being within the steering-angle range, the process 200 proceeds to a decision block 225.

In the decision block 225, the computer 105 determines whether the speed at which the vehicle 100 is traveling exceeds the vehicle-speed threshold, as described above. In response to the speed being below the vehicle-speed threshold, the process 200 ends. In response to the speed exceeding the vehicle-speed threshold, the process 200 proceeds to a decision block 230.

In the decision block 230, the computer 105 determines whether the speed has exceeded the vehicle-speed threshold for at least the second time threshold. In response to the speed exceeding the vehicle-speed threshold for less than the second time threshold, the process 200 returns to the block 205 to continue receiving data for a longer time. In response to the speed exceeding the vehicle-speed threshold for at least the second time threshold, the process 200 proceeds to a block 235.

In the block 235, the computer 105 determines the difference between the wheel speeds of different wheels 110 of the vehicle 100, as described above.

Next, in a decision block 240, the computer 105 determines whether the difference exceeds the difference threshold, as described above. In response to the difference being below the difference threshold, the process 200 ends. In response to the difference exceeding the difference threshold, the process 200 proceeds to a block 245.

In the block 245, the computer 105 sets the flag and outputs the message indicating the low pressure of the tire 115, as described above.

Next, in a decision block 250, the computer 105 re-determines the difference and determines whether the difference is below the difference threshold for at least the third time threshold, as described above. In response to the difference exceeding the difference threshold or being below the difference threshold for less than the third time threshold, the process 200 remains at the decision block 250 to continue checking the difference against the difference threshold. In response to the difference being below the difference threshold for at least the third time threshold, the process 200 proceeds to a block 255.

In the block 255, the computer 105 removes the flag, as described above. After the block 255, the process 200 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions (e.g., from a memory, a computer readable medium, etc.) and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

The disclosure has been described in an illustrative manner, and it is to be understood that the terminology which has been used is intended to be in the nature of words of description rather than of limitation. Use of "in response to," "upon determining," etc. indicates a causal relationship, not merely a temporal relationship. Terms such as "front," "forward," "longitudinal," "back," "rearward," "left," "right," "lateral," "upward," "downward," "vertical," etc., are understood relative to the vehicle 100. The adjectives "first," "second," and "third" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A vehicle system comprising:
   a tire-pressure monitoring system of a vehicle; and
   a computer of the vehicle, the computer comprising a processor and a memory, the memory storing instructions executable by the processor to:
   determine that the tire-pressure monitoring system is inactive;
   identify a fastest wheel speed and a slowest wheel speed of wheel speeds of at least four different wheels of the vehicle;
   in response to a speed at which the vehicle is traveling exceeding a vehicle-speed threshold and the determination that the tire-pressure monitoring system is inactive, determine a difference between the fastest wheel speed and the slowest wheel speed; and in response to the difference exceeding a difference threshold, output a message indicating low pressure of a tire of one of the wheels.

2. The vehicle system of claim 1, wherein the instructions further include instructions to, in response to the speed exceeding the vehicle-speed threshold and a steering angle of the vehicle being within a steering-angle range, determine the difference between the fastest wheel speed and the slowest wheel speed.

3. The vehicle system of claim 2, wherein the steering-angle range includes a straight-ahead steering angle.

4. The vehicle system of claim 1, further comprising a respective tire-pressure monitoring system for each tire; and the instructions further include instructions to, in response to the speed exceeding the vehicle-speed threshold and at least one of the tire-pressure monitoring systems being inactive, determine the difference between the fastest wheel speed and the slowest wheel speed.

5. The vehicle system of claim 1, wherein the instructions further include instructions to, in response to the speed exceeding the vehicle-speed threshold for at least a time threshold, determine the difference between the fastest wheel speed and the slowest wheel speed.

6. The vehicle system of claim 1, wherein the instructions further include instructions to, in response to the speed exceeding the vehicle-speed threshold and a current operational mode of the vehicle being a first operational mode, determine the difference between the fastest wheel speed and the slowest wheel speed.

7. The vehicle system of claim 1, wherein the fastest wheel speed and the slowest wheel speed occur simultaneously.

8. The vehicle system of claim 1, wherein the difference is expressed as a proportion of the slowest wheel speed.

9. The vehicle system of claim 1, wherein the instructions further include instructions to, in response to the difference exceeding the difference threshold, set a flag in the memory.

10. The vehicle system of claim 9, wherein the instructions further include instructions to, in response to the vehicle starting with the flag set, output the message indicating low pressure of the tire.

11. The vehicle system of claim 9, wherein the instructions further include instructions to, in response to the difference being less than the difference threshold for at least a time threshold after setting the flag, remove the flag.

12. The vehicle system of claim 1, wherein the instructions to determine that the tire-pressure monitoring system is inactive include instructions to determine that the tire-pressure monitoring system is inactive in response to receiving a diagnostic trouble code indicating that the tire-pressure monitoring system is inactive.

13. The vehicle system of claim 1, wherein the instructions to determine that the tire-pressure monitoring system is inactive include instructions to determine that the tire-pressure monitoring system is inactive in response to not receiving data from the tire-pressure monitoring system for at least a time threshold.

14. A method comprising:

determining that a tire-pressure monitoring system of a vehicle is inactive;

identifying a fastest wheel speed and a slowest wheel speed of wheel speeds of at least four different wheels of the vehicle;

in response to a speed at which the vehicle is traveling exceeding a vehicle-speed threshold and the determination that the tire-pressure monitoring system is inactive, determining a difference between the fastest wheel speed and the slowest wheel speed; and in response to the difference exceeding a difference threshold, outputting a message indicating low pressure of a tire of one of the wheels.

15. The method of claim 14, further comprising, in response to the speed exceeding the vehicle-speed threshold and a steering angle of the vehicle being within a steering-angle range, determining the difference between the fastest wheel speed and the slowest wheel speed.

16. The method of claim 14, wherein the vehicle includes a respective tire-pressure monitoring system for each wheel;

the method further comprising, in response to the speed exceeding the vehicle-speed threshold and at least one of the tire-pressure monitoring systems being inactive, determining the difference between the fastest wheel speed and the slowest wheel speed.

17. The method of claim 14, further comprising, in response to the speed exceeding the vehicle-speed threshold for at least a time threshold, determining the difference between the fastest wheel speed and the slowest wheel speed.

18. The method of claim 14, further comprising, in response to the speed exceeding the vehicle-speed threshold and a current operational mode of the vehicle being a first operational mode, determining the difference between the fastest wheel speed and the slowest wheel speed.

19. The method of claim 14, wherein determining that the tire-pressure monitoring system is inactive includes determining that the tire-pressure monitoring system is inactive in response to receiving a diagnostic trouble code indicating that the tire-pressure monitoring system is inactive.

20. The method of claim 14, wherein determining that the tire-pressure monitoring system is inactive includes determining that the tire-pressure monitoring system is inactive in response to not receiving data from the tire-pressure monitoring system for at least a time threshold.

* * * * *